(12) United States Patent
Suzuki et al.

(10) Patent No.: US 6,755,497 B2
(45) Date of Patent: Jun. 29, 2004

(54) INK-JET PRINTING APPARATUS, CONTROL METHOD THEREOF, AND DATA PROCESSING APPARATUS AND METHOD

(75) Inventors: Kenichi Suzuki, Kanagawa (JP); Kazumasa Matsumoto, Kanagawa (JP); Satoshi Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 09/960,962

(22) Filed: Sep. 25, 2001

(65) Prior Publication Data

US 2002/0063746 A1 May 30, 2002

(30) Foreign Application Priority Data

Sep. 26, 2000 (JP) ........................................ 2000-292925

(51) Int. Cl.[7] .................................................. B41J 2/21
(52) U.S. Cl. .......................................... 347/15; 347/43
(58) Field of Search ............................. 347/15, 43, 14, 347/41; 358/1.2, 1.9, 1.6, 54, 501, 502, 518, 534, 298

(56) References Cited

U.S. PATENT DOCUMENTS 5,189,521 A * 2/1993 Ohtsubo et al. ............ 358/296

6,164,747 A 12/2000 Yashima et al. ............. 347/15

FOREIGN PATENT DOCUMENTS

JP          10-324002         12/1998

* cited by examiner

Primary Examiner—Lamson D Nguyen
(74) Attorney, Agent, or Firm—Fitzpatrick, Cella, Harper & Scinto

(57) ABSTRACT

A printhead including plural groups of nozzles, which are provided for plural types of ink and each group of nozzles consists of a plurality of nozzles corresponding to one type of ink, is used to print a pixel with dots which are formed with plural types of ink. For the plural groups of nozzles in the printhead, a per-nozzle density table, indicative of a print density for each nozzle constituting the group of nozzles, is provided. With respect to a pixel of interest, a nozzle to be driven for discharge is determined, and a print density of the pixel of interest is calculated with reference to the per-nozzle density table. Based on the calculated print density of the pixel and a print density of the pixel designated by image data, error diffusion processing is performed. Density unevenness in the nozzles is corrected in this manner to achieve high-quality image forming.

24 Claims, 15 Drawing Sheets

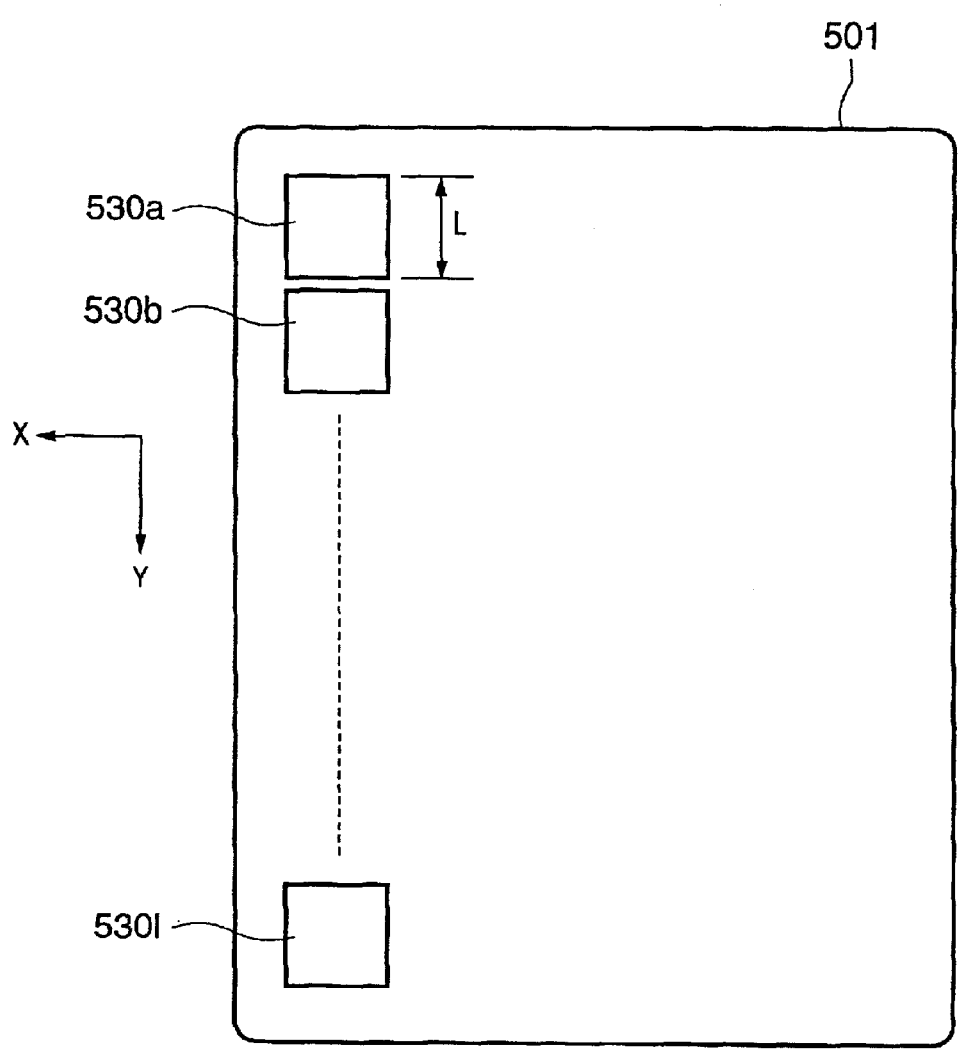

FIG. 9

| No | K#6 | K#5 | K#4 | K#3 | K#2 | K#1 | dl(i) | th(i) |
|---|---|---|---|---|---|---|---|---|
| 0  | ○ | ○ | ○ | ○ | × | × | 0.0   |       |
| 1  | ○ | ○ | ○ | × | ○ | × | 8.6   | 4.3   |
| 2  | ○ | ○ | ○ | × | × | × | 17.3  | 13.1  |
| 3  | ○ | ○ | ○ | × | × | × | 25.9  | 21.6  |
| 4  | ○ | ○ | ○ | × | × | × | 34.6  | 30.4  |
| 5  | ○ | ○ | ○ | × | × | × | 43.2  | 38.9  |
| 6  | ○ | ○ | ○ | × | × | × | 51.9  | 47.6  |
| 7  | ○ | × | ○ | ○ | ○ | × | 60.5  | 56.2  |
| 8  | ○ | × | ○ | ○ | × | ○ | 64.8  | 62.7  |
| 9  | ○ | × | ○ | ○ | × | ○ | 69.2  | 67.0  |
| 10 | ○ | × | ○ | ○ | × | ○ | 73.5  | 71.3  |
| 11 | ○ | × | ○ | ○ | × | ○ | 77.8  | 75.6  |
| 12 | ○ | × | ○ | ○ | × | ○ | 82.1  | 80.0  |
| 13 | ○ | × | ○ | ○ | × | ○ | 86.4  | 84.3  |
| 14 | ○ | × | ○ | × | ○ | ○ | 90.8  | 88.6  |
| 15 | ○ | × | ○ | × | ○ | ○ | 95.1  | 92.9  |
| 16 | ○ | × | ○ | × | ○ | ○ | 99.4  | 97.2  |
| 17 | ○ | × | ○ | × | ○ | × | 103.7 | 101.6 |
| 18 | ○ | × | × | ○ | ○ | ○ | 108.1 | 105.9 |
| 19 | ○ | × | × | ○ | ○ | × | 112.4 | 110.2 |
| 20 | ○ | × | × | × | ○ | ○ | 116.7 | 114.5 |
| 21 | ○ | × | × | × | ○ | × | 121.0 | 118.9 |
| 22 | × | ○ | ○ | ○ | ○ | ○ | 125.3 | 123.2 |
| 23 | × | ○ | ○ | ○ | ○ | ○ | 129.7 | 127.5 |
| 24 | × | ○ | ○ | ○ | × | ○ | 134.0 | 131.8 |
| 25 | × | ○ | ○ | ○ | ○ | ○ | 138.3 | 136.1 |
| 26 | × | ○ | ○ | ○ | ○ | ○ | 142.6 | 140.5 |
| 27 | × | ○ | ○ | ○ | × | ○ | 147.6 | 144.8 |
| 28 | × | ○ | ○ | × | ○ | ○ | 151.3 | 149.1 |
| 29 | × | ○ | ○ | ○ | ○ | ○ | 155.6 | 153.4 |
| 30 | × | ○ | ○ | × | ○ | ○ | 159.9 | 157.8 |
| 31 | × | ○ | ○ | ○ | × | ○ | 164.2 | 162.1 |
| 32 | × | ○ | ○ | × | ○ | ○ | 168.6 | 166.4 |
| 33 | × | ○ | ○ | × | ○ | ○ | 172.9 | 170.7 |
| 34 | × | ○ | × | × | ○ | ○ | 177.2 | 175.0 |
| 35 | × | ○ | × | × | × | ○ | 181.5 | 179.4 |
| 36 | × | ○ | × | × | × | × | 185.9 | 183.7 |
| 37 | × | × | ○ | ○ | ○ | ○ | 190.2 | 188.0 |
| 38 | × | × | ○ | ○ | ○ | × | 194.5 | 192.3 |
| 39 | × | × | ○ | ○ | × | ○ | 198.8 | 196.7 |
| 40 | × | × | ○ | ○ | × | × | 203.1 | 201.0 |
| 41 | × | × | ○ | × | ○ | ○ | 207.5 | 205.3 |
| 42 | × | × | ○ | × | ○ | × | 211.8 | 209.6 |
| 43 | × | × | ○ | × | × | ○ | 216.1 | 213.9 |
| 44 | × | × | × | ○ | ○ | × | 220.4 | 218.3 |
| 45 | × | × | × | ○ | ○ | ○ | 224.8 | 222.6 |
| 46 | × | × | × | ○ | ○ | × | 229.1 | 226.9 |
| 47 | × | × | × | ○ | × | ○ | 233.4 | 231.2 |
| 48 | × | × | × | ○ | × | × | 237.7 | 235.6 |
| 49 | × | × | × | × | ○ | ○ | 242.0 | 239.9 |
| 50 | × | × | × | × | ○ | × | 246.4 | 244.2 |
| 51 | × | × | × | × | × | ○ | 250.7 | 248.5 |
| 52 | × | × | × | × | × | ○ | 255.0 | 252.8 |
| ※  | ○ | ○ | ○ | × | × | × | 13.0  | 10.8  |
| ※  | ○ | ○ | ○ | × | × | × | 30.3  | 28.1  |
| ※  | ○ | ○ | × | × | × | ○ | 38.9  | 36.7  |
| ※  | ○ | ○ | × | × | × | ○ | 47.5  | 45.4  |

FIG. 10

| | 513a | 513b | 513c | 513d | 513e | 513f | 513g | 513h | 513i | 513j | 513k | 513l |
|---|---|---|---|---|---|---|---|---|---|---|---|---|
| | C#1 | C#2 | M#1 | M#2 | Y#1 | Y#2 | K#1 | K#2 | K#3 | K#4 | K#5 | K#6 |
| | 0.8 | 1.6 | 0.8 | 1.6 | 0.8 | 1.6 | 0.06 | 0.11 | 0.22 | 0.44 | 0.89 | 1.72 |
| 1 | 0.82 | 1.63 | 0.8 | 0.6 | 0.78 | 1.6 | 0.06 | 0.11 | 0.23 | 0.46 | 0.9 | 1.7 |
| 2 | 0.82 | 1.63 | 0.8 | 0.61 | 0.78 | 1.6 | 0.06 | 0.11 | 0.23 | 0.45 | 0.91 | 1.71 |
| 3 | 0.82 | 1.63 | 0.8 | 0.6 | 0.79 | 1.6 | 0.06 | 0.11 | 0.23 | 0.46 | 0.9 | 1.7 |
| 4 | 0.82 | 1.62 | 0.81 | 0.6 | 0.79 | 1.6 | 0.06 | 0.11 | 0.22 | 0.45 | 0.91 | 1.7 |
| 5 | 0.82 | 1.63 | 0.8 | 1.61 | 0.79 | 1.6 | 0.06 | 0.12 | 0.22 | 0.44 | 0.9 | 1.71 |
| 6 | 0.82 | 1.62 | 0.81 | 1.61 | 0.8 | 1.6 | 0.06 | 0.11 | 0.22 | 0.43 | 0.89 | 1.72 |
| 7 | 0.82 | 1.62 | 0.8 | 1.6 | 0.8 | 1.6 | 0.06 | 0.12 | 0.22 | 0.43 | 0.91 | 1.72 |
| 8 | 0.82 | 1.62 | 0.79 | 1.61 | 0.8 | 1.6 | 0.06 | 0.11 | 0.23 | 0.45 | 0.92 | 1.7 |
| 9 | 0.82 | 1.61 | 0.79 | 1.61 | 0.8 | 1.61 | 0.06 | 0.12 | 0.22 | 0.46 | 0.92 | 1.7 |
| 10 | 0.82 | 1.61 | 0.79 | 1.61 | 0.8 | 1.61 | 0.06 | 0.11 | 0.23 | 0.46 | 0.91 | 1.71 |
| 11 | 0.82 | 1.62 | 0.8 | 1.62 | 0.8 | 1.61 | 0.06 | 0.12 | 0.22 | 0.46 | 0.9 | 1.71 |
| 12 | 0.82 | 1.62 | 0.8 | 1.62 | 0.8 | 1.61 | 0.06 | 0.11 | 0.23 | 0.47 | 0.88 | 1.72 |
| 13 | 0.82 | 1.61 | 0.8 | 1.61 | 0.8 | 1.61 | 0.06 | 0.12 | 0.22 | 0.45 | 0.88 | 1.71 |
| 14 | 0.82 | 1.61 | 0.81 | 1.61 | 0.79 | 1.61 | 0.07 | 0.11 | 0.23 | 0.45 | 0.87 | 1.72 |
| 15 | 0.82 | 1.61 | 0.81 | 1.61 | 0.8 | 1.61 | 0.06 | 0.12 | 0.22 | 0.45 | 0.9 | 1.73 |
| 16 | 0.81 | 1.6 | 0.8 | 1.6 | 0.8 | 1.61 | 0.06 | 0.11 | 0.22 | 0.44 | 0.9 | 1.73 |
| 17 | 0.81 | 1.59 | 0.8 | 1.59 | 0.79 | 1.61 | 0.07 | 0.11 | 0.21 | 0.44 | 0.92 | 1.73 |
| 18 | 0.81 | 1.59 | 0.8 | 1.6 | 0.8 | 1.61 | 0.06 | 0.12 | 0.22 | 0.45 | 0.92 | 1.73 |
| 19 | 0.81 | 1.59 | 0.81 | 1.6 | 0.79 | 1.6 | 0.06 | 0.11 | 0.22 | 0.45 | 0.91 | 1.73 |
| 20 | 0.81 | 1.6 | 0.81 | 1.6 | 0.8 | 1.6 | 0.07 | 0.11 | 0.21 | 0.44 | 0.9 | 1.73 |
| 21 | 0.81 | 1.6 | 0.81 | 1.59 | 0.8 | 1.6 | 0.06 | 0.12 | 0.22 | 0.44 | 0.87 | 1.73 |
| 22 | 0.81 | 1.6 | 0.81 | 1.59 | 0.8 | 1.6 | 0.06 | 0.11 | 0.22 | 0.45 | 0.86 | 1.73 |
| 23 | 0.81 | 1.61 | 0.81 | 1.61 | 0.8 | 1.61 | 0.07 | 0.11 | 0.21 | 0.45 | 0.9 | 1.73 |
| 24 | 0.81 | 1.61 | 0.81 | 1.61 | 0.8 | 1.61 | 0.06 | 0.12 | 0.22 | 0.45 | 0.92 | 1.73 |
| 25 | 0.81 | 1.6 | 0.8 | 1.61 | 0.8 | 1.6 | 0.06 | 0.11 | 0.22 | 0.45 | 0.91 | 1.73 |
| 26 | 0.81 | 1.6 | 0.8 | 1.61 | 0.81 | 1.6 | 0.07 | 0.12 | 0.2 | 0.45 | 0.88 | 1.73 |
| 27 | 0.81 | 1.6 | 0.81 | 1.6 | 0.81 | 1.6 | 0.06 | 0.12 | 0.21 | 0.45 | 0.87 | 1.73 |
| 28 | 0.81 | 1.6 | 0.81 | 1.6 | 0.81 | 1.6 | 0.06 | 0.12 | 0.21 | 0.45 | 0.9 | 1.73 |
| ... | ... | ... | ... | ... | ... | ... | ... | ... | ... | ... | ... | ... |
| 233 | 0.79 | 1.61 | 0.81 | 1.62 | 0.79 | 1.59 | 0.06 | 0.11 | 0.21 | 0.45 | 0.91 | 1.72 |
| 234 | 0.79 | 1.61 | 0.81 | 1.62 | 0.79 | 1.59 | 0.06 | 0.11 | 0.21 | 0.44 | 0.88 | 1.72 |
| 235 | 0.79 | 1.62 | 0.8 | 1.61 | 0.79 | 1.59 | 0.06 | 0.1 | 0.2 | 0.44 | 0.91 | 1.71 |
| 236 | 0.79 | 1.62 | 0.8 | 1.6 | 0.79 | 1.6 | 0.06 | 0.11 | 0.21 | 0.43 | 0.89 | 1.7 |
| 237 | 0.79 | 1.62 | 0.79 | 1.62 | 0.79 | 1.6 | 0.06 | 0.11 | 0.21 | 0.43 | 0.9 | 1.69 |
| 238 | 0.79 | 1.63 | 0.79 | 1.63 | 0.79 | 1.6 | 0.05 | 0.11 | 0.21 | 0.43 | 0.9 | 1.7 |
| 239 | 0.8 | 1.63 | 0.8 | 1.63 | 0.79 | 1.6 | 0.05 | 0.11 | 0.21 | 0.44 | 0.91 | 1.7 |
| 240 | 0.8 | 1.63 | 0.8 | 1.62 | 0.79 | 1.6 | 0.06 | 0.1 | 0.21 | 0.44 | 0.87 | 1.7 |
| 241 | 0.8 | 1.63 | 0.8 | 1.62 | 0.79 | 1.6 | 0.06 | 0.11 | 0.21 | 0.44 | 0.88 | 1.69 |
| 242 | 0.8 | 1.63 | 0.8 | 1.6 | 0.79 | 1.6 | 0.05 | 0.11 | 0.21 | 0.44 | 0.89 | 1.68 |
| 243 | 0.8 | 1.62 | 0.81 | 1.62 | 0.8 | 1.6 | 0.06 | 0.11 | 0.21 | 0.44 | 0.92 | 1.68 |
| 244 | 0.8 | 1.62 | 0.81 | 1.59 | 0.8 | 1.6 | 0.05 | 0.1 | 0.21 | 0.44 | 0.92 | 1.7 |
| 245 | 0.8 | 1.62 | 0.8 | 1.61 | 0.8 | 1.6 | 0.06 | 0.11 | 0.21 | 0.44 | 0.88 | 1.72 |
| 246 | 0.81 | 1.63 | 0.81 | 1.62 | 0.8 | 1.6 | 0.05 | 0.11 | 0.21 | 0.44 | 0.89 | 1.71 |
| 247 | 0.81 | 1.62 | 0.81 | 1.62 | 0.8 | 1.6 | 0.06 | 0.1 | 0.21 | 0.44 | 0.91 | 1.71 |
| 248 | 0.81 | 1.62 | 0.81 | 1.62 | 0.8 | 1.6 | 0.06 | 0.11 | 0.21 | 0.45 | 0.88 | 1.71 |
| 249 | 0.81 | 1.63 | 0.8 | 1.63 | 0.8 | 1.6 | 0.06 | 0.11 | 0.21 | 0.44 | 0.87 | 1.71 |
| 250 | 0.81 | 1.62 | 0.8 | 1.62 | 0.8 | 1.6 | 0.06 | 0.1 | 0.21 | 0.45 | 0.89 | 1.71 |
| 251 | 0.81 | 1.62 | 0.8 | 1.62 | 0.8 | 1.6 | 0.06 | 0.11 | 0.21 | 0.44 | 0.91 | 1.71 |
| 252 | 0.81 | 1.62 | 0.81 | 1.62 | 0.8 | 1.6 | 0.06 | 0.11 | 0.21 | 0.45 | 0.9 | 1.71 |
| 253 | 0.81 | 1.63 | 0.81 | 1.62 | 0.8 | 1.6 | 0.06 | 0.1 | 0.22 | 0.44 | 0.9 | 1.71 |
| 254 | 0.81 | 1.63 | 0.81 | 1.62 | 0.8 | 1.6 | 0.06 | 0.11 | 0.22 | 0.45 | 0.92 | 1.71 |
| 255 | 0.81 | 1.63 | 0.81 | 1.63 | 0.8 | 1.6 | 0.06 | 0.11 | 0.23 | 0.44 | 0.89 | 1.71 |
| 256 | 0.81 | 1.63 | 0.81 | 1.63 | 0.8 | 1.6 | 0.06 | 0.11 | 0.23 | 0.45 | 0.89 | 1.71 |

FIRST PASS

SECOND PASS

INK-JET PRINTING APPARATUS, CONTROL METHOD THEREOF, AND DATA PROCESSING APPARATUS AND METHOD

FIELD OF THE INVENTION

The present invention relates to an ink-jet printing apparatus and control method thereof and, more particularly, to an ink-jet printing apparatus and control method thereof capable of faithful reproduction of image data.

BACKGROUND OF THE INVENTION

As recent years have seen advances in capabilities of an ink-jet printing apparatus, not only texts but also images are printed by the apparatus. In order to increase printing speed, an ink-jet printing apparatus generally comprises a group of nozzles where plural ink discharge orifices (nozzles) are integrally arranged for discharging one color and one density of ink. Furthermore, a plurality of such group of nozzles are respectively provided for different densities of one color of ink or for different colors of ink.

The ink-jet printing apparatus of this type performs printing by discharging ink from the group of nozzles while moving a printhead, having the group of nozzles, relative to a print medium. To move the printhead relative to a print medium, the following methods are adopted.

(1) A printhead, whose nozzles are arranged substantially in parallel to the direction X, is moved in the direction Y orthogonal to the direction X while a print medium is at rest, and printing is performed. Then, the print medium is intermittently moved by a predetermined distance in the direction X, and the printhead is moved in the direction Y for printing. Printing operation performed by repetition of the aforementioned processes is a so-called swath printing method.

(2) The nozzles are fixedly arranged in a manner such that they cover the entire length of a print medium in the direction Y, and printing is performed by moving the print medium at a constant speed in the direction X. This printing is a so-called full-multi printing method.

When an image is printed in these methods, a pixel is defined as a unit constructing an image. A pixel is not always constructed with a single dot (dot is formed by single ink discharge from a nozzle to a print medium), but may be constructed with a plurality of dots. In case of forming a pixel with a plurality of dots, these dots may be printed on substantially the same point, or may be printed on neighboring points. Either way, a pixel is defined by a predetermined rule. Image data to be printed is broken down to pixels by image processing means, and with respect to each of the pixels, a color to be printed and its density are determined by a predetermined rule. Printing is executed according to this determination. As mentioned above, one pixel may be constructed with a plurality of dots. In such case, different colors and densities of ink may be selected instead of one color and one density.

To faithfully reproduce tones of image data in image printing, a pseudo halftone processing method, e.g., dither processing, error diffusion processing and so on, is employed. In dither processing and error diffusion processing, a larger number of tones can be expressed if the number of tones expressed by one pixel is increased. A specific example of such printing method is described in Patent Application Laid-Open No. 10-324002.

More specifically, a group of nozzles capable of discharging different densities of ink are provided for one color, and printing is performed by superimposing ink from nozzles, selected from the aforementioned group of nozzles within a limitation set in advance for one pixel. By this, tones expressed by one pixel can be increased. For instance, a group of nozzles capable of discharging six types of densities are provided, and a pixel having 600 dpi is formed by superimposing ink four times or less. In this case, the pixel can express 50 tones or more. Moreover, if a pixel, constructed with neighboring 2×2 points, is formed by superimposing ink the total of 16 times or less, the pixel can express 100 tones or more.

In the foregoing case, a rule, which associates the tone to be expressed with the method of ink superimposition, is determined in advance, and actual printing is performed according to the rule, i.e., which nozzles to use and when to discharge ink are determined. According to the determination, printing control means performs printing operation.

An example of superimposing ink is described hereinafter. First of all, a density is measured for a case of printing a pixel with each ink. Based on the measured values, densities obtained by superimposing ink are calculated, and a table associating each density with a combination of nozzles is prepared. A combination of nozzles, which achieves a closest density to the portion corresponding to a pixel of interest, is selected from the table. In the case of error diffusion processing, a difference is obtained between a density of the portion corresponding to the pixel of interest and a density in the table (density obtained by superimposing ink), and the obtained difference is diffused as an error.

When an image is printed by the aforementioned method, the amount of ink discharged from a group of nozzles is supposed to be constant. However, because of the printhead's structural reason, the state of ink, or the state of driving mechanism for ink discharge and so forth, the amount of ink discharge is not constant in the strict sense. If printing is performed with the nozzles having such variations in the amount of ink discharge, an error is generated partially on a print image, and problems occur, e.g., a density unevenness is generated in the part which is supposed to have a uniform density, or a density variation supposed to show is submerged in noise and cannot be seen.

The similar problems occur not only when the amount of ink discharge is not constant, but also when ink density slightly differs depending on the position in the group of nozzles. In addition, the similar problems occur in a case where a printing pitch, which is supposed to be uniform, becomes partially larger or smaller than a predetermined density due to uneven directions of ink discharge.

This is problematic in a case where faithful reproduction of an original image density is required, for instance, a medical image. A monochrome image is usually printed on a medium for medical evaluation. The reason thereof is that human eyes have a higher density resolving power for a monochrome image. Therefore, the amount of data that can be recognized by human eyes is large in a monochrome image. Furthermore, it is known that a density resolving power, that can be recognized by human eyes, is higher when using a transmission-type print medium rather than a reflection-type print medium. It is said in general that the density resolving power of human eyes is about 8 bits for a color image and 10 to 11 bits for a monochrome transmission image. Medical X-ray photographs or CT/MRI images printed on transmission-type media are read actually to the limit of the human density resolving power for providing information for diagnoses. In the field that requires such high quality in images, the aforementioned slight density difference causes unevenness or granularity in images.

In order to solve these problems, a so-called shading correction has been proposed. In the shading correction, test pattern printing is performed in advance at a constant density (density which should be constant) using a number of ink combination patterns, then densities of the test patterns are read by a scanner, and density unevenness is obtained to correct image data subjected to printing. (Note: the "test pattern printing . . . at a constant density (density which should be constant)" means that the density should be constant if the density in the printing portion has a value as designed. In reality, the density becomes slightly uneven because of an error caused by various factors.) However, if the shading correction is applied to the aforementioned printing method, in which a pixel is constructed by multiple superimposition of dots, the number of combination patterns becomes substantially large, making the processing complicated (for instance, the case of selecting up to four types of densities out of six types of different densities with redundancy). Furthermore, if image data of an original image is corrected, then correction is necessary for the corrected density again, and the correction may not converge.

SUMMARY OF THE INVENTION

The present invention has been proposed in view of the above problems, and has as its object to enable correction of density unevenness in each nozzle and to enable high quality image formation.

Furthermore, an object of the present invention is to enable correction of density unevenness in each nozzle for printing an image by constructing a pixel with plural types of ink superimposition, thereby enabling high quality image formation.

According to the present invention, the foregoing object is attained by providing an ink-jet printing apparatus comprising: a printhead including a group of nozzles constituted by a plurality of nozzles; storage means for storing a density table indicating a print density of ink discharged from each nozzle constituting the group of nozzles; determination means for determining a nozzle to be driven for discharge in the group of nozzles; and density compensation means for obtaining from the density table a print density corresponding to the nozzle, determined to be driven for discharge by the determination means, and performing compensation control of a print density based on the obtained print density.

According to the present invention, the foregoing object is attained by providing an ink-jet printing apparatus for printing a pixel with dots formed with plural types of ink, comprising: a printhead including a plurality of a group of nozzles provided for a plurality of types of ink, each of the group of nozzles constituted by a plurality of nozzles corresponding to one type of ink, storage means for storing a density table, indicating a print density of ink discharged from each nozzle constituting the group of nozzles, with respect to at least one group of nozzles among the plurality of the group of nozzles of the printhead; determination means for determining a nozzle to be driven for discharge in the plurality of the group of nozzles, with respect to a pixel of interest based on image data; calculation means for obtaining a print density corresponding to the nozzle, determined to be driven for discharge by the determination means, with reference to the density table and calculating a print density of the pixel of interest; and density compensation means for performing compensation control of a print density based on the print density of the pixel of interest calculated by the calculation means and a print density of the pixel of interest designated by the image data.

According to the present invention, the foregoing object is attained by providing a data processing apparatus generating print-driving data for a printing apparatus which performs printing by using a printhead including a group of nozzles constituted by a plurality of nozzles, comprising: storage means for storing a density table indicating a print density of ink discharged from each nozzle constituting the group of nozzles; determination means for determining a nozzle to be driven for discharge in the group of nozzles; density compensation means for obtaining from the density table a print density corresponding to the nozzle, determined to be driven for discharge by the determination means, and performing compensation control of a print density on the determination means based on the obtained print density; and output means for outputting data, indicative of the nozzle to be driven for discharge, determined by the determination means, as the print-driving data.

According to the present invention, the foregoing object is attained by providing a data processing apparatus generating print-driving data for a printing apparatus which prints a pixel with dots formed with plural types of ink by utilizing a printhead including a plurality of a group of nozzles provided for a plurality of types of ink, each of the group of nozzles constituted by a plurality of nozzles corresponding to one type of ink, comprising: storage means for storing a density table, indicating a print density of ink discharged from each nozzle constituting the group of nozzles, with respect to at least one group of nozzles among the plurality of the group of nozzles of the printhead; determination means for determining a nozzle to be driven for discharge in the plurality of the group of nozzles, with respect to a pixel of interest based on image data; calculation means for obtaining a print density corresponding to the nozzle, determined to be driven for discharge by the determination means, with reference to the density table and calculating a print density of the pixel of interest; density compensation means for performing compensation control of a print density on the determination means based on the print density of the pixel of interest calculated by the calculation means and a print density of the pixel of interest designated by the image data; and output means for outputting data, indicative of the nozzle to be driven for discharge, determined by the determination means, as the print-driving data.

Still further, the present invention provides a control method of the above-described ink-jet printing apparatus and a data processing method using the aforementioned data processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a print example of a test pattern;

FIG. 9 shows an example of an ink superimposition combination table 104b;

FIG. 10 shows an example of a per-nozzle density table 104c;

DETAILED DESCRIPTION OF THE PREFERRED EMBODIMENTS

Preferred embodiments of the present invention will now be described in detail in accordance with the accompanying drawings.

[First Embodiment]

Figure 1:
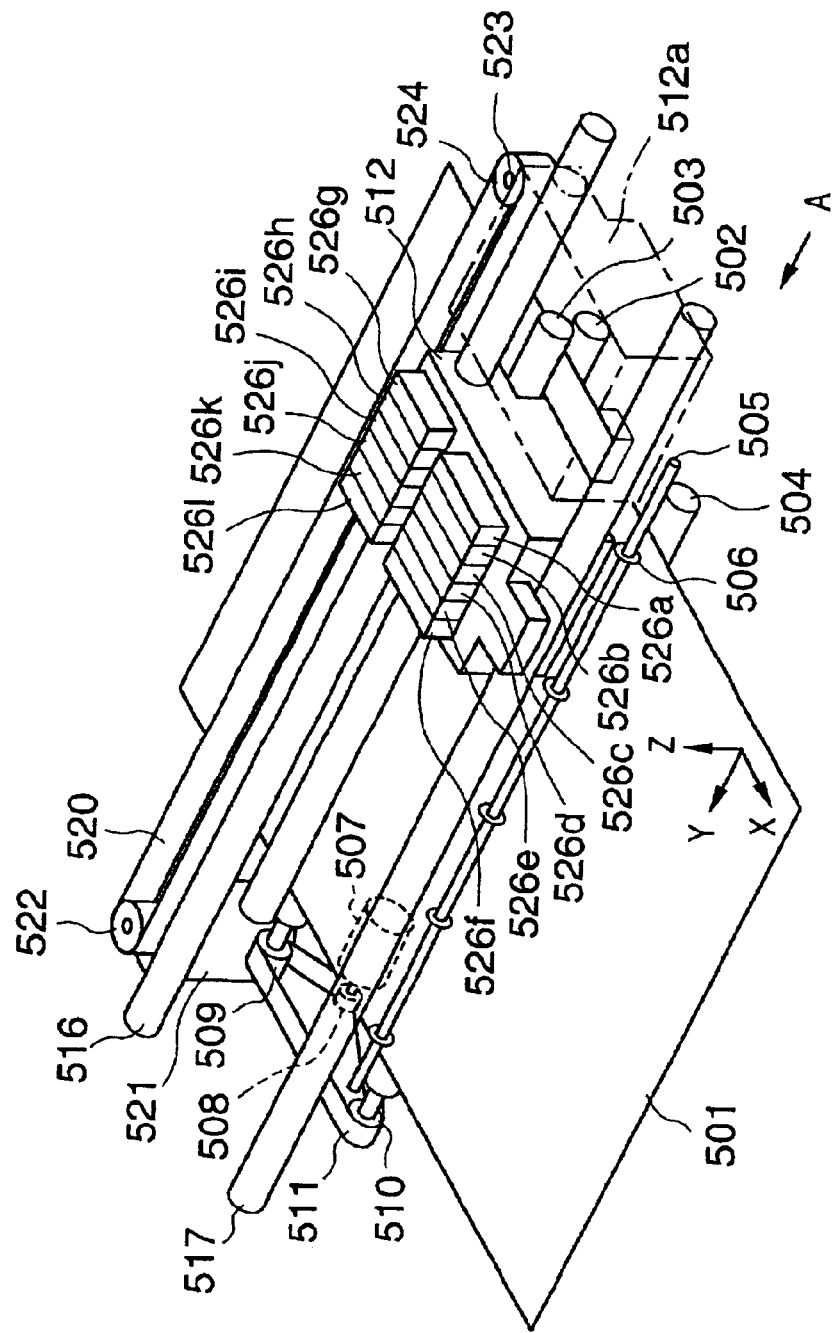
FIG. 1 is a perspective view showing the main portion (printing portion) of an ink-jet printing apparatus according to an embodiment of the present invention.
Figure 2:
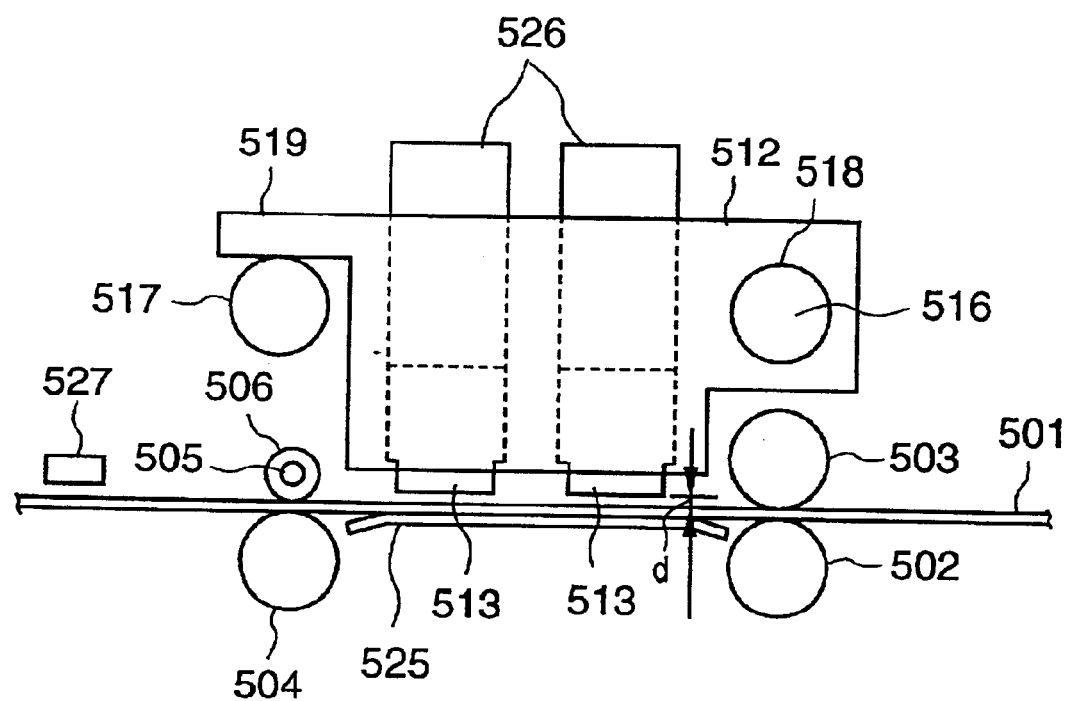
FIG. 2 is a side view of the main portion of the ink-jet printing apparatus shown in FIG. 1.

FIG. 1 is a perspective view showing the main portion (printing portion) of an ink-jet printing apparatus according to the present invention; FIG. 2 is a side view thereof (a view seen from the arrow A in FIG. 1); and FIGS. 3, 4A and 4B are detailed views of respective portions.

In these drawings, reference numeral 501 denotes a sheet on which an image is printed; 502 and 503, and 504 and 505, each provided in pairs, denote rollers for conveying the sheet 501 in the direction X. Protuberances 506 are provided partially on the roller 505 to come in contact with the sheet 501. Reference numeral 507 denotes a motor; and 508, a pulley attached to a motor axle. Reference numerals 509 and 510 denote pulleys, attached to an end of respective rollers 502 and 504, and associated with the pulley 508 by a belt 511. The rollers 502 and 504 rotate by rotation of the motor 507. The rollers 503 and 505 are pressed against the rollers 502 and 504 by a mechanism not shown in the drawing. By the foregoing construction, the sheet 501 is conveyed to the direction X.

Figure 3:
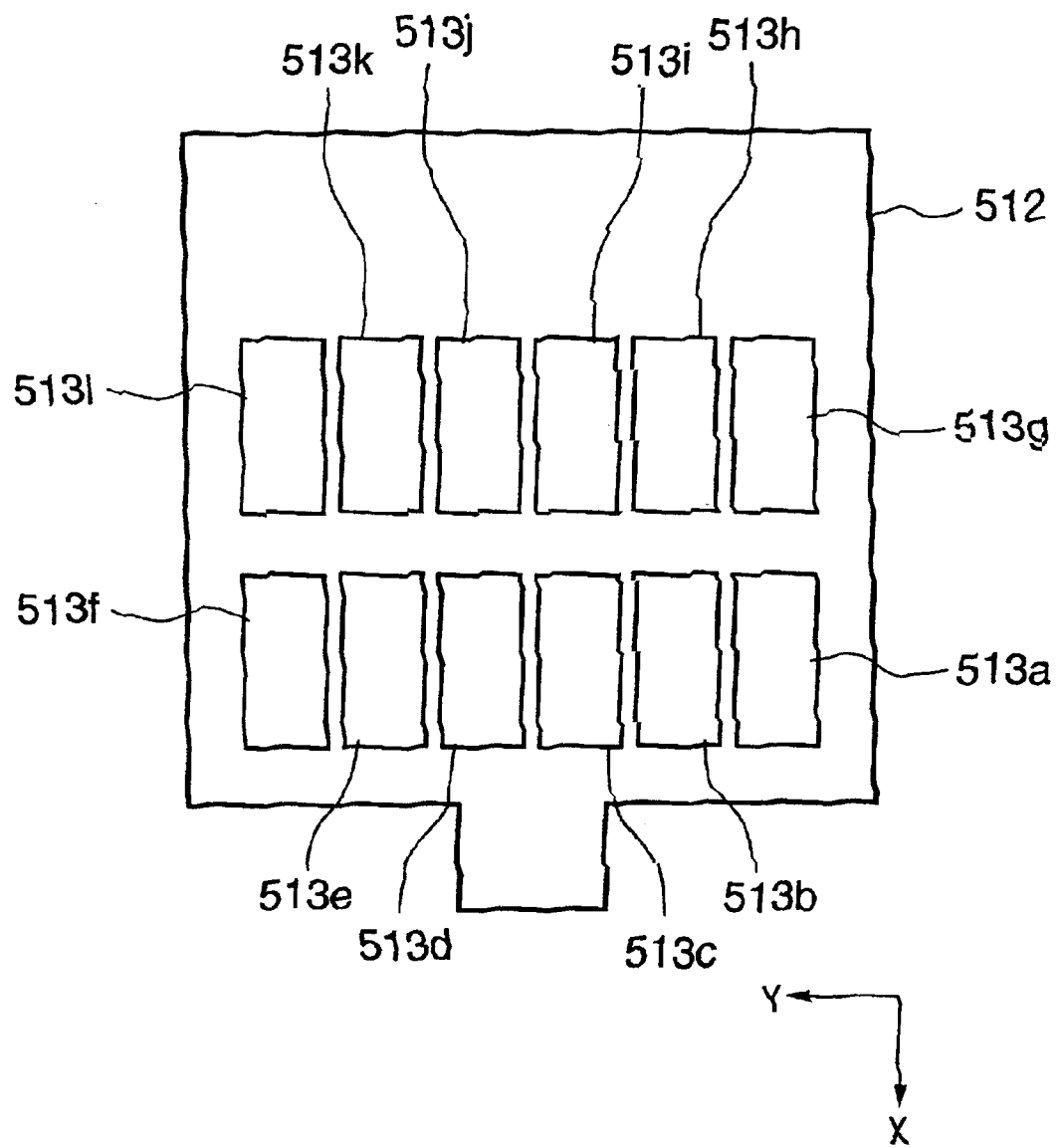
FIG. 3 is a view showing a carriage holding a plurality of printheads in the ink-jet printing apparatus shown in FIG. 1.
Figure 4A:
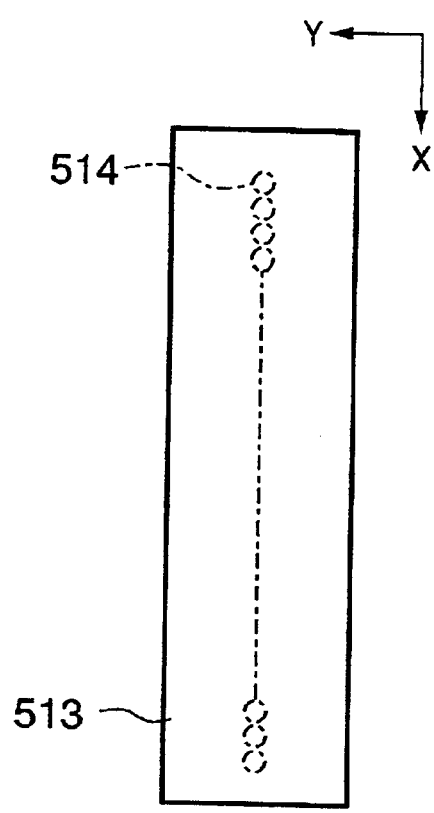
FIGS. 4A and 4B are explanatory views of a printhead mounted to the carriage shown in FIG. 3.
Figure 4B:
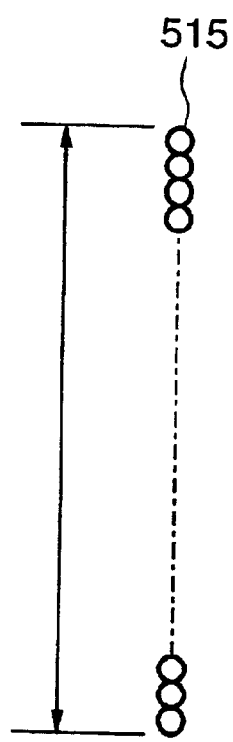

Reference numeral 512 denotes a carriage carrying a plurality of printheads 513a to 513l (FIG. 3). On each of the printheads, a number of nozzles (nozzle group) are provided to face the sheet as shown in FIG. 4A. Reference numerals 516 and 517 denote shafts slidably provided on the carriage. The shaft 516 penetrates a hole 518 (FIG. 2) of the carriage 512 while a protuberant portion 519 (FIG. 2) of the carriage 512 sits on the shaft 517. By the foregoing construction, the surface of the printhead 513, on which nozzles are provided, faces the sheet with a predetermined distance d.

Reference numeral 520 denotes a belt partially fixed to the carriage 512. The belt 520 connects a pulley 522, attached to an axle of a motor 521, with a pulley 524 rotatably attached to a fixed axle 523. By the foregoing construction, the carriage can move in the direction Y and the opposite direction thereof with the rotation of the motor 521. The carriage is capable of moving the entire area of the sheet in the direction Y, and to a position 512a which is the stand-by position of the carriage, as well as a position opposite to the position 512a with respect to the sheet. Note when the carriage moves over the sheet, the nozzle surface and the sheet maintain the distance d.

Reference numerals 526a to 526l denote ink cartridges, containing ink and attached to printheads 513a to 513l for supplying ink to the head. A head cartridge 526 is detachable from the printhead 513 so that an ink cartridge containing no ink can be exchanged for a new ink cartridge for ink replenishment. Twelve ink cartridges are prepared. More specifically, starting from 526a, two types of dark and light cyan, two types of dark and light magenta, two types of dark and light yellow, and six types of densities of black. In place of these ink, two types of dark and light red, two types of dark and light green, and two types of dark and light blue may be used.

These ink cartridges 526a to 526l can be attached respectively to the printheads 513a to 513l. Reference numeral 525 (FIG. 2) denotes a sheet guide provided between the rollers 502 and 504. The surface of the sheet guide 525, where the sheet 501 comes into contact, has a large number of small holes, and is subjected to air suction from the bottom in FIG. 2 by way of means not shown in the drawing. By virtue of suction pressure, the sheet 501 comes closely into contact with the sheet guide 525, preventing the sheet 501 from lifting. If the sheet is lifted, naturally the distance d cannot be maintained, and furthermore, the sheet may touch the printhead. By the foregoing construction, ink is discharged to the sheet 501 from each nozzle, thereby forming a dot 515 (FIG. 4).

Reference numeral 527 in FIG. 2 denotes a density sensor. The density sensor is used to measure density of each area of a test pattern in FIG. 5 (to be described later) formed on the sheet 501.

Note that, a transparent type sensor or a reflective type sensor can be used as the density sensor 527. The transparent type sensor includes a light emitting part and a light receiving part. Therefore, when the transparent type sensor is used, one of these parts is installed at the position of 527, and the other is installed at the position opposite to the sheet (not shown). The reflective type sensor is used for measuring the print density of the reflection-type print medium, and the transparent type sensor is used for measuring the print density of the transmission-type print medium.

FIG. 5 shows a print example of a test pattern. The test pattern, such as that shown in FIG. 5, is printed on the sheet 501 by the ink-jet printing apparatus shown in FIG. 1. Reference numerals 530a to 530l denote printed areas where 100% printing is performed (printing is performed using all nozzles without superimposition). The printed sheet is returned to the direction opposite to the direction X, and conveyed again in the direction X at a constant speed. During this sheet conveyance, the density sensor 527 reads the density of each printed area of the test pattern. Alternatively, the sheet, on which the test pattern is printed, is conveyed again to the printhead portion, and is conveyed in the direction X at a constant speed. During this sheet conveyance, the density sensor 527 reads the density of each printed area of the test pattern. Alternatively, the density of each printed area of the test pattern on the sheet is read by a density sensor provided externally to the apparatus. For example, the density may be measured by using a scanner externally to the apparatus. In such a case, the read data must be transmitted to the printer from the external device.

Figure 6:
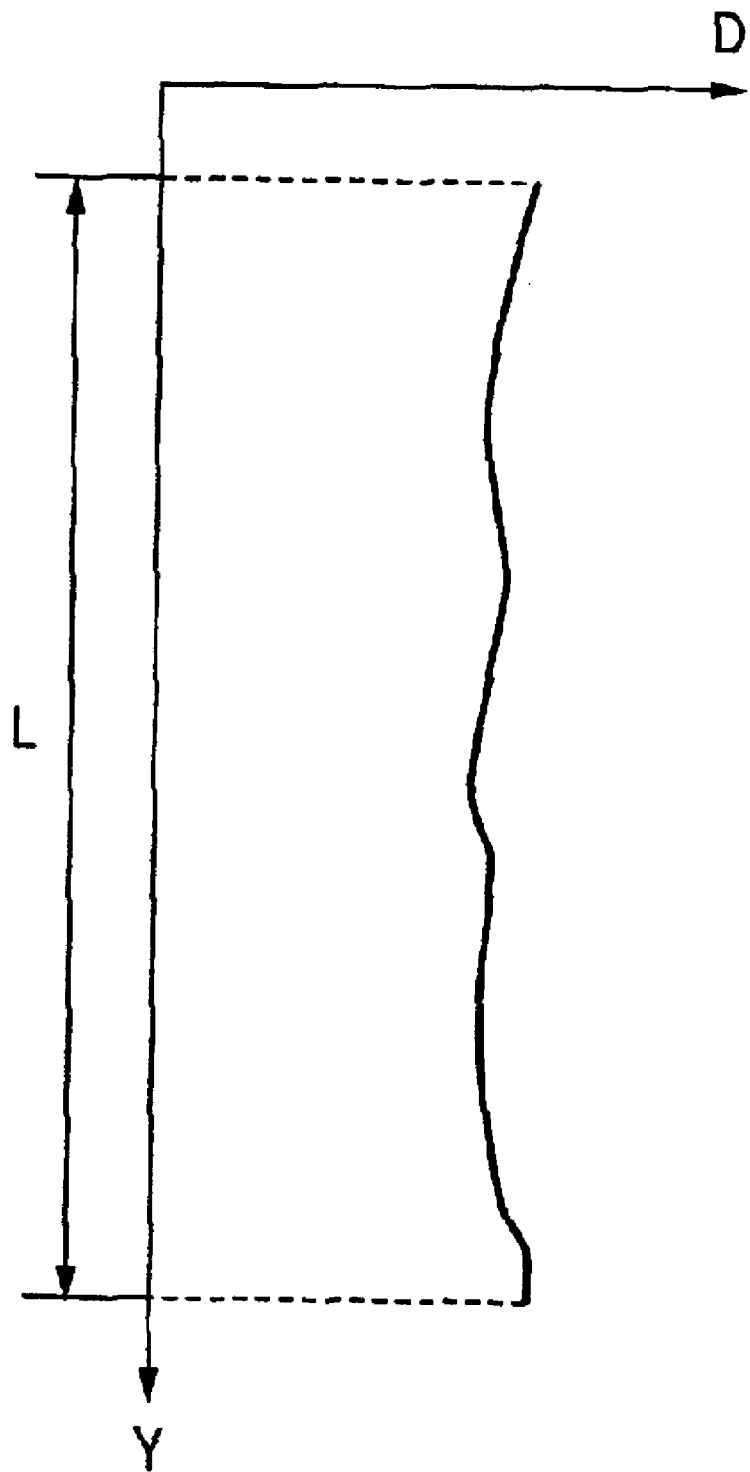
FIG. 6 shows an example of density data obtained by the test pattern shown in FIG. 5.

FIG. 6 shows an example of read density data. FIG. 6 shows the result of reading density data in one area. The horizontal axis indicates density D, and the vertical axis indicates the reading position. Reference letter L in FIG. 6 corresponds to L in FIG. 5, that is, a band width printed with all nozzles of the group of nozzles. The density D corresponding to each nozzle position is obtained by dividing the length L, by the number of nozzles. The obtained density D is stored in a density table 104c (described later) as a value at a predetermined level with a predetermined threshold value.

Figure 7:
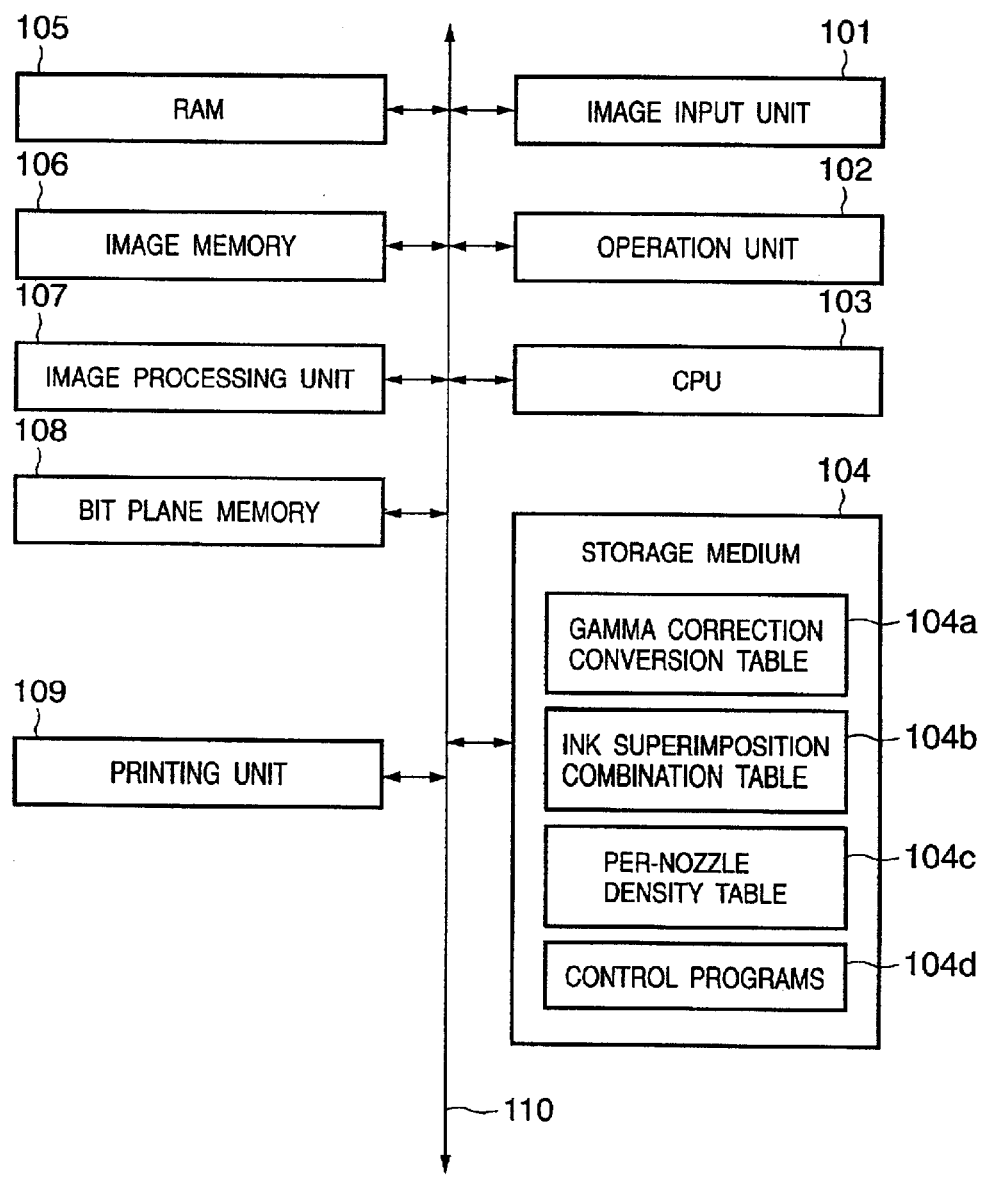
FIG. 7 is a block diagram explaining an example of an image processing apparatus according to an embodiment of the present invention.
Figure 8:
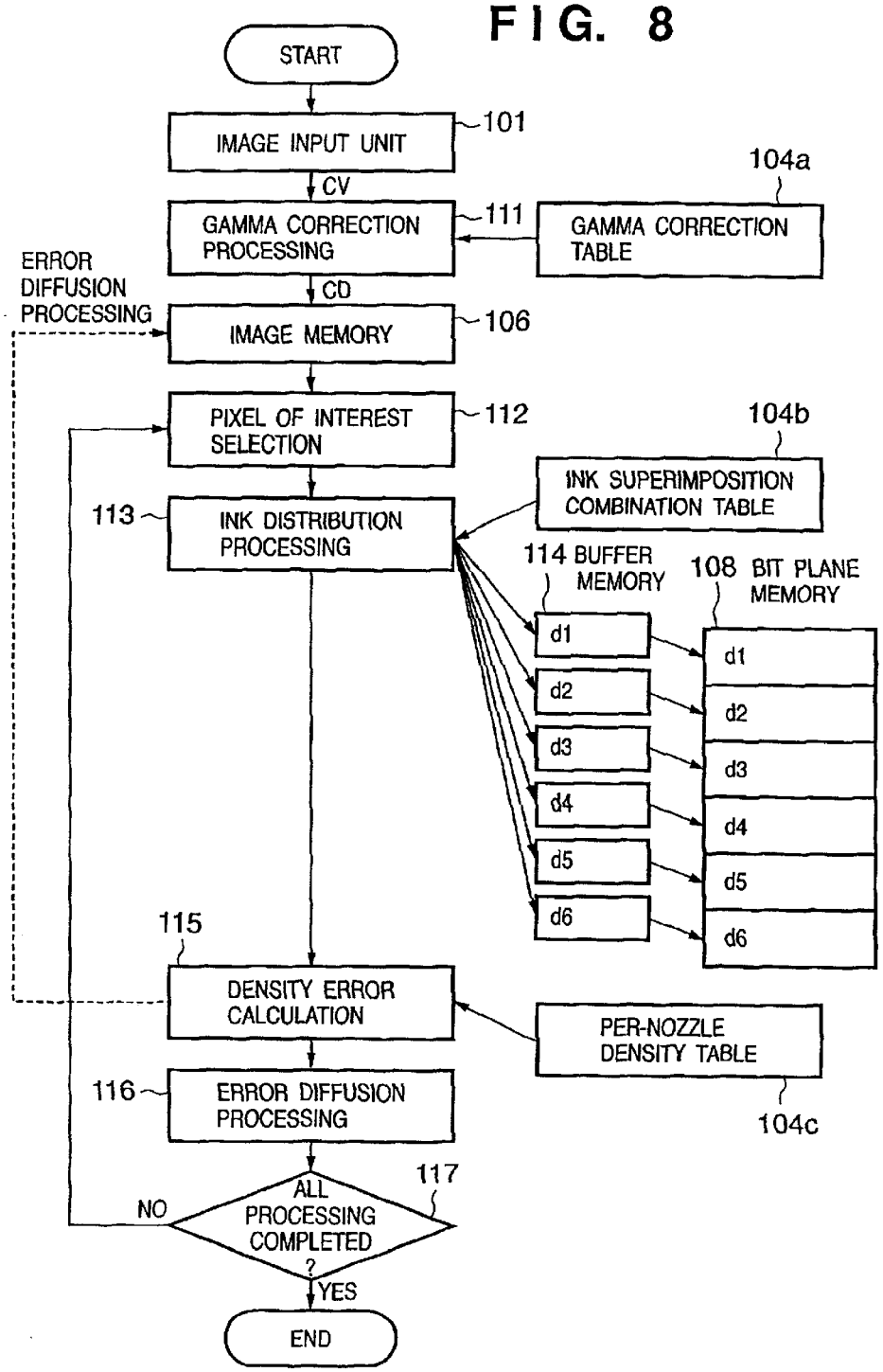
FIG. 8 is an explanatory diagram showing image processing performed by the image processing apparatus shown in FIG. 7.

FIG. 7 is a block diagram explaining an example of the image processing apparatus according to the present embodiment for generating a bit plane for superimposing a plurality of ink having different densities on one pixel. FIG. 8 is an explanatory diagram showing image processing performed by the image processing apparatus shown in FIG. 7.

As shown in FIG. 7, the image processing apparatus comprises: an image input unit 101; an operation unit 102; a CPU 103 for controlling processing; a storage medium 104 storing programs for operating the apparatus and various tables; RAM 105 used as a work area of various programs in the storage medium; image memory 106 storing an input image; an image processing unit 107 for binarizing image data; bit plane memory 108 storing binarized image data; and a printing unit 109 (having the construction shown in FIGS. 1 to 4B) for executing image formation by the ink-jet printing method based on data stored in the bit plane memory 108, each of which is connected through a bus line 110 transmitting address signals, data, control signals and so on. The storage medium 104 stores a gamma correction conversion table 104a, ink superimposition combination table 104b, per-nozzle density table 104c, and control programs 104d. Functions thereof will be apparent from the descriptions provided below.

Hereinafter, description is provided with reference to FIGS. 7 and 8 on binarizing processing of image data performed by the image processing unit 107. Described first is a case of a monochrome image where only monochrome ink is used. Note in the following description, assume that one pixel is constructed with dots superimposed on a single point for the purpose of simple explanation. However, the identical processing can be performed in a case where one pixel is constructed with dots superimposed on plural neighboring points.

In the stage of gamma correction processing 111 in FIG. 8, an image signal CV (Code Value), inputted at the image input unit 101, is converted to a signal CD indicative of a density by using the gamma correction conversion table 104a, and the converted signal is stored in the image memory 106. In the stage of pixel of interest selection 112, a pixel subjected to processing is selected from the image memory 106, and density data CD of the selected pixel is obtained.

In the stage of ink distribution processing 113, the ink superimposition combination table 104b is referred in order to select an ink combination corresponding to the density data CD obtained in the stage of pixel of interest selection 112. The selection is made as follows.

The following Table 1 shows ink employed by the printhead of the present embodiment.

TABLE 1

| types | #1 | #2 | #3 | #4 | #5 | #6 |
|---|---|---|---|---|---|---|
| dye density | 0.125 | 0.25 | 0.5 | 1 | 2 | 3.88 |
| transmission density | 0.06 | 0.11 | 0.22 | 0.44 | 0.89 | 1.72 |

As shown in Table 1 the present embodiment uses six types of ink, which are numbered #1 to #6 from the lowest density first. Also, Table 1 shows the dye density (%) of each ink and transmission density (printed value of OD) for a case of printing on a transmission-type print medium. Note that each ink consists of a dye and solvent. Used as the solvent is water including various additives, such as a surfactant, moisturizer and so on. These additives control the discharging characteristics of a printhead and absorbing characteristics of a print medium.

With the use of the ink shown in Table 1, the number of tones that can be expressed by one pixel is 6+15+20+15+1 ($_6C_1+_6C_2+_6C_3+_6C_4$+1(density 0))=57 under the condition that the maximum number of times of superimposition on one pixel is four and that ink of an identical dye density is not superimposed. Note that the ink set in Table 1 has a dye density which does not produce an identical density in any combination. Furthermore, the dye density ratio of ink which forms a single ink dot is almost, starting from the ink having the lowest density, 1:2:4:8:16:32. Of the 57 tones, 53 tones are used to output an image. In other words, inputted image data (256 tones in this example) is made into 53-valued data and an image is outputted.

FIG. 9 shows an example of the ink superimposition combination table 104b. The ink superimposition combination table 104b stores the types of ink and combination thereof for expressing each of the aforementioned 53 tones. Note the column "No." in FIG. 9 indicates each tone. Moreover, the row indicated by "$\cdot \cancel{\chi} \cdot$" shows the combination not to be used in order to make the difference of density levels small in a low density area compared to a high density area.

In the columns of Ink K#1 to K#6 "○" indicates discharging ink from a printhead and "X" indicates not discharging ink from the printhead. The column of d1(i) (i=integer between 0–52) indicates a value of density data CD corresponding to a tone level (53 levels). Note that CD values of 256 levels correspond to the values of transmission density OD, which are obtained by equally dividing the range of the expressible transmission density OD (0–3.27 in the present embodiment) into 256. Furthermore, the column of th(i) (i=integer between 0–52) indicates a threshold value for selecting a tone from the 53 tones for inputted image data. Note that the threshold value (th(k)) is normally the midpoint of the density data CD value at the tone level k−1 (d1(k−1)) and the density data CD value at the tone level k (d1 (k)).

The ink type combination marked "○" in the ink superimposition combination table 104b is used to express each tone. According to this combination of superimposition, binary signals d1 to d6, indicating discharge or no discharge for each density of ink, are determined in the stage of ink distribution processing 113 (FIG. 8).

Referring back to FIG. 8, the binary signals d1 to d6 obtained in the foregoing manner are transferred to the buffer memory 114. As the binary data is transmitted bit by bit, the buffer memory 114 bit-shifts the binary data, and transfers the data to the bit plane memory 108 when a defined amount of data is accumulated. More specifically, in a case where the bit plane memory 108 has a 8-bit bus width, the buffer memory 114 transfers data to the bit plane memory 108 each time data for 8 bits is accumulated. The plane data is stored in an address area of the bit plane memory provided for each bit plane.

In the stage of density error calculation 115, the per-nozzle density table 104c is referred to sum the transmission density OD values which will be obtained in a case of printing a pixel of interest with the nozzle to be used for the pixel of interest, utilizing the superimposition combination determined in the stage of ink distribution processing 113.

FIG. 10 shows an example of the per-nozzle density table 104c. In FIG. 10, the far-left column indicates the nozzle number of each printhead. In this example, one printhead comprises 256 nozzles. Furthermore, the first row in FIG. 10 indicates the printhead number (corresponding to 513a to 513l in FIG. 3), the second row indicates the type of ink, and the third row indicates the designed value of transmission density OD where one pixel is formed by one dot. Provided at each intersection of these columns and rows is an actual measured value of the transmission density value OD, obtained in a case of printing with corresponding nozzles. When a pixel of interest and the type of ink to be used are decided, nozzles to be used for printing the pixel of interest are specified. By referring to the per-nozzle density table 104c, the transmission density value OD, obtained in a case of printing with the specified nozzles, is calculated.

To sum the densities of plural types of ink, the transmission density value OD for the nozzles used in printing a pixel of interest is obtained from the per-nozzle density table 104c according to the discharge/no discharge signals, which has been developed in the buffer memory 114 based on the ink superimposition combination determined in the aforementioned process, and summation is performed.

Next, an OD value is converted to a print CD value according to the following equation which associates OD with CD. The print CD value is the CD value corresponding to the transmission density OD value of actually recorded.

$$\text{print CD value} = 255 \times \text{OD value}/3.27 = 255(1 - \text{OD value}/3.27)$$

Next, a difference Δ between the density and the CD value (desired density data CD value) of a pixel of interest is calculated.

$$\Delta = \text{desired density data CD value} - \text{print CD value}$$

In the foregoing manner, a difference Δ (density error) is obtained in the stage of density error calculation 115 in FIG. 8.

In the stage of error diffusion processing 116, the difference Δ, calculated in the stage of density error calculation 115, is diffused to peripheral pixels of the pixel of interest in the image memory 106 according to a predetermined distribution coefficient. By performing the above-described processing, processing for the pixel of interest completes.

The foregoing processes 112 to 116 are repeated for the number of all pixels based on the density data CD of the image, thereby forming bit planes d1 to d6 for each ink-jet unit in different address areas of the bit plane memory 108.

Figure 11:
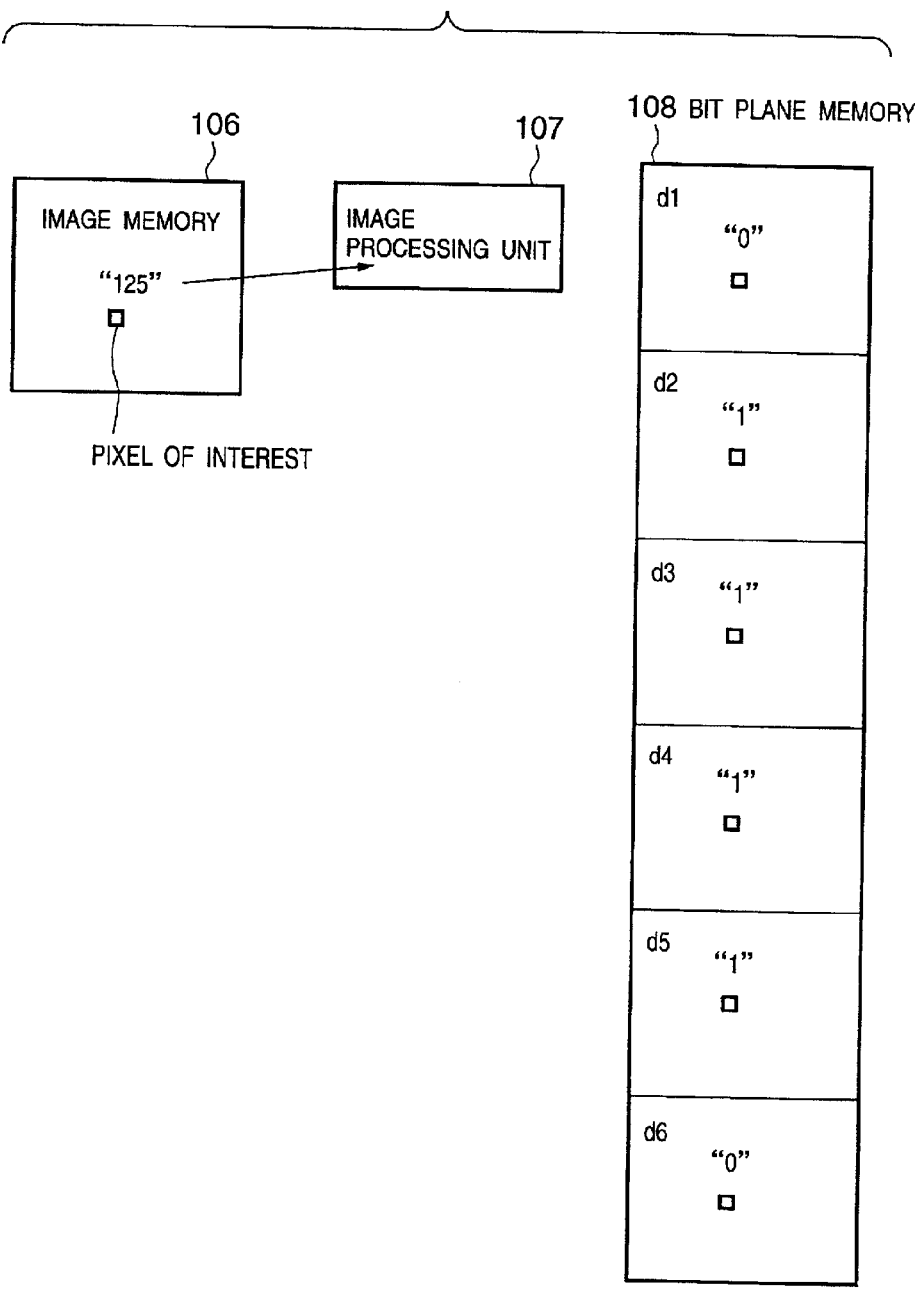
FIG. 11 is a conceptual view of memory operation at the time of bit plane generation in image processing shown in FIG. 8.

FIG. 11 is a conceptual view of memory operation at the time of bit plane generation in the image processing shown in FIG. 8. The density data CD of a multi-tone image in the image memory 106 is processed by the aforementioned image processing unit, and bit planes for each ink-jet unit are generated in the bit plane memory 108.

More specifically, binary data, indicative of discharge/no discharge for each ink-jet unit, generated for a density value of a pixel of interest in the image memory 106, is stored in an address for a pixel, located at the substantially same position as the pixel of interest in the bit plane provided for each ink-jet unit in the bit plane memory 108.

For instance, assume that a value of density data CD of a pixel of interest is 125. The density data is converted to binary data, indicative of ink discharge/no discharge, with reference to the ink superimposition combination table 104b shown in FIG. 9 in binarizing processing of the aforementioned image processing unit 107. Since the density is 125, the tone number 22 is selected, and binary data 0, 1, 1, 1, 1, 0 is stored respectively in the bit planes d1 to d6 of the buffer memory 114. When the data is stored in the bit plane memory 108, each of the binary data 0, 1, 1, 1, 1, 0 is stored at a position substantially the same as the pixel of interest in the bit plane memories d1 to d6 provided for each ink-jet unit.

When printing is performed, the sheet 501 in FIG. 2 is transferred from the right side of the drawing to the space between the rollers 502 and 503 by means (not shown). Then, the sheet 501 is intermittently transferred by a predetermined distance in the direction X by the motor 507. While the sheet 501 is at rest, the motor 521 rotates to move the carriage in the direction Y at a constant speed. While the printhead mounted on the carriage moves over the sheet 501, a nozzle discharge command signal corresponding to an image signal is sent by the aforementioned printing control, and a liquid droplet is selectively discharged from each nozzle according to the command signal. When the printhead passes the sheet 501 and moves away from the sheet 501, the motor 507 moves the sheet 501 by a predetermined distance in the direction X and stops. Then, the motor 50 again moves the sheet 501 at a predetermined speed, and a liquid droplet is selectively discharged in the similar manner. As this operation is repeated, a desired image is printed on the sheet 501. The printed sheet is conveyed to the left in FIG. 2 by the rollers 504 and 506, and discharged to the left in the drawing by conveyance means (not shown).

As has been described above, when a pixel is constructed by superimposing plural types of ink, the first embodiment of the present invention obtains an actual print density value for each nozzle, and performs error diffusion processing based on the obtained density value. Therefore, the difference in characteristics of the nozzles can be corrected, and image quality can be improved.

<Modification Example>

Although the description in the foregoing first embodiment is provided on a monochrome image only, the similar processing can be performed for a color image. More specifically, an inputted image signal is converted to C, M, and Y color signals, the processes 112 to 116 in FIG. 8 are performed with respect to each color, and binary signals indicative of discharge/no discharge is developed on bit planes provided respectively for each printhead of respective colors. Then, printing is performed according to the binary signals.

Furthermore, the foregoing first embodiment assumes that one group of nozzles (printhead) passes one pixel only once. However, one group of nozzles may pass one pixel plural numbers of times. For instance, in order to superimpose a certain density of ink a plurality of number of times, or to conceal unevenness in the joint between bands (swath) printed by a group of nozzles, or to conceal a streak caused by a kink of each nozzle (deviation of discharge position from a predetermined position), the sheet is not moved for one intermission or moved by L/2 or L/4 instead of moving the sheet by L (band width printed by all nozzles of one group of nozzles). In this case, the first time the nozzles pass the pixel is called the first pass, and the second time the nozzles pass the pixel is called the second pass. A part of the all pixels is recorded by the first pass. The remaining pixels are recorded by the second pass. Thus, all the pixels are recorded by the first pass and second pass. Pixel positions to be recorded at the first pass, and pixel positions to be recorded at the second pass are decided beforehand. For example, as shown in FIG. 12B, it is decided that the pixels at the positions (1) are recorded by the first pass, and the pixels at the positions (2) are recorded by the second pass. As long as the pass movement is predetermined, nozzles to be used for the pixel of interest are specified for each pass.

Figure 12A:
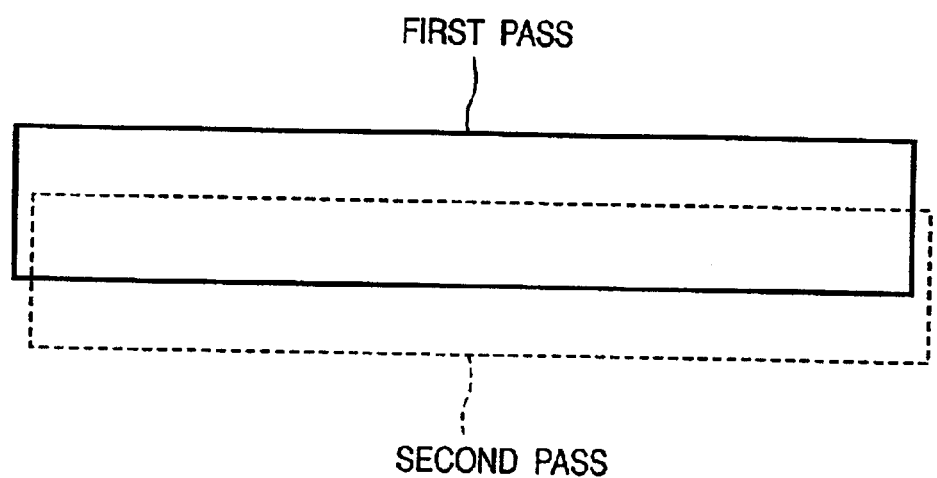
FIG. 12A is a conceptual view of swath printing in an example of moving a print sheet by L/2 (two-pass printing)
Figure 12B:
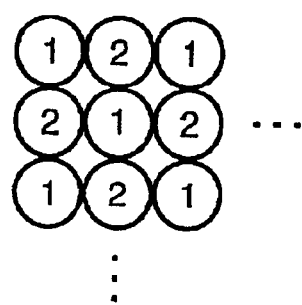
FIG. 12B shows the example of the recording pixel positions of the first pass and the second pass.
Figure 13:
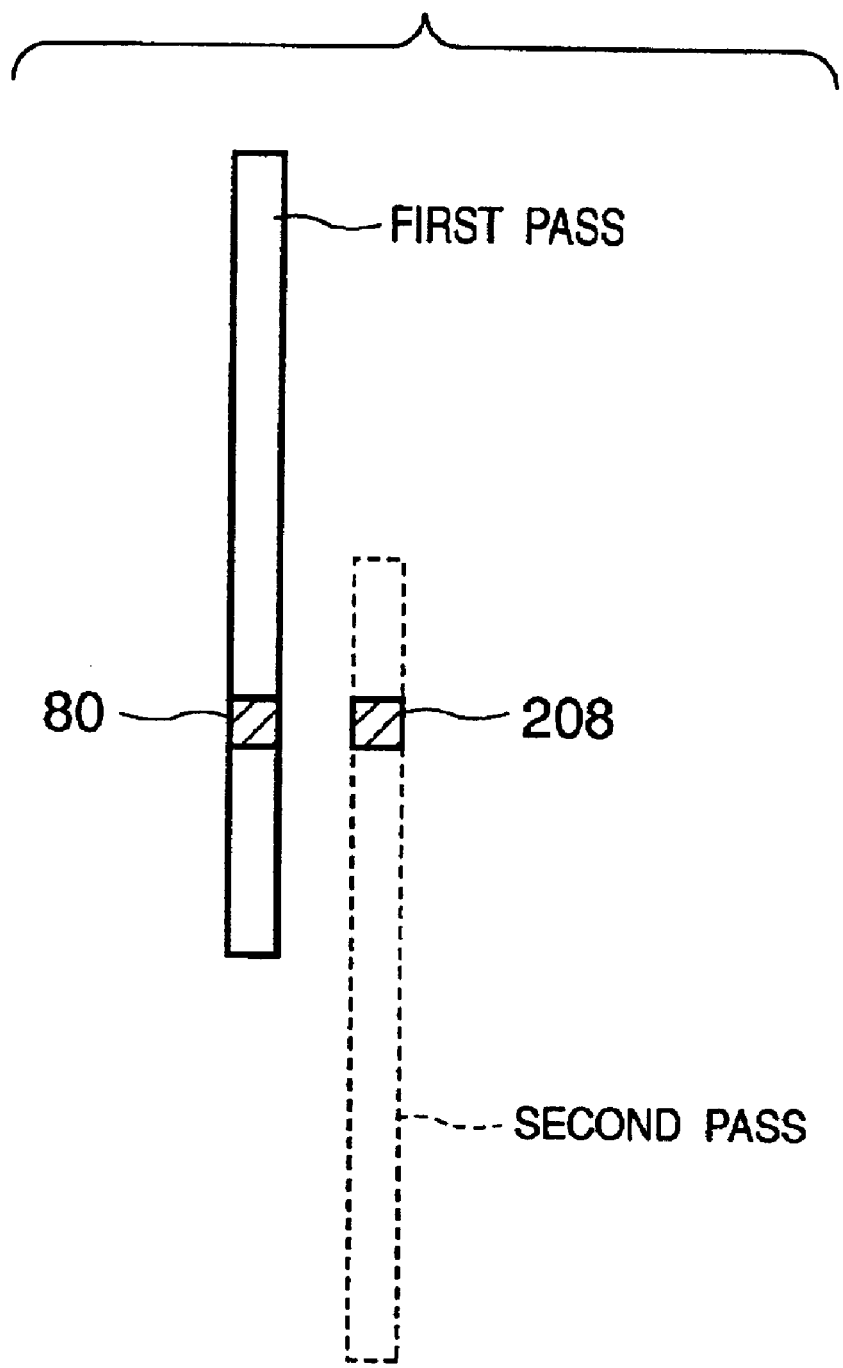
FIG. 13 is an explanatory view of nozzle correspondence in a case of performing the two-pass printing shown in FIG. 12A.

Further description is provided with reference to FIGS. 12A and 13. FIG. 12A is a conceptual view of swath printing in an example of moving a print sheet by L/2 (two-pass printing). First, the solid line area is printed in the first pass, and the sheet moves upward by L/2, i.e., the printhead moves downward in the drawing by L/2 given that the sheet is fixed. At this position, the second pass printing is performed, and the swath indicated by the dotted lines is formed.

FIG. 13 is an explanatory view of nozzle correspondence in a case of performing the two-pass printing shown in FIG. 12A. For the explanatory purpose, FIG. 13 shows the printhead seen from the sheet. For example, the pixel printed by the 80th nozzle in the first pass is printed by the 208th nozzle in the second pass. Therefore, as long as the type of ink, pixel position, and the order of pass are determined, nozzles to be used are specified.

In this case, the buffer memory 114 and bit plane memory 108 in FIG. 8 are prepared for the number of passes with respect to each ink. A binary signal, indicative of discharge/ no discharge is written in the memory for the nozzle to be used in order of each pass. Furthermore, in the stage of density error calculation 115, density summation is performed on all passes.

As another example, the buffer memory 114 and bit plane memory 108 may commonly be used for a plurality of passes. After a binary signal is developed in the bit planes, data is selectively extracted from the bit planes in a predetermined pattern for performing actual printing. When printing for all passes is completed, pixels having "discharge" in the bit plane 108 should be printed. In this case, the nozzle to be used and the pass number at which the pixel of interest is printed are specified in the summation of the density error calculation 115, and the density value of the specified nozzle is adopted.

[Second Embodiment]

Figure 14:
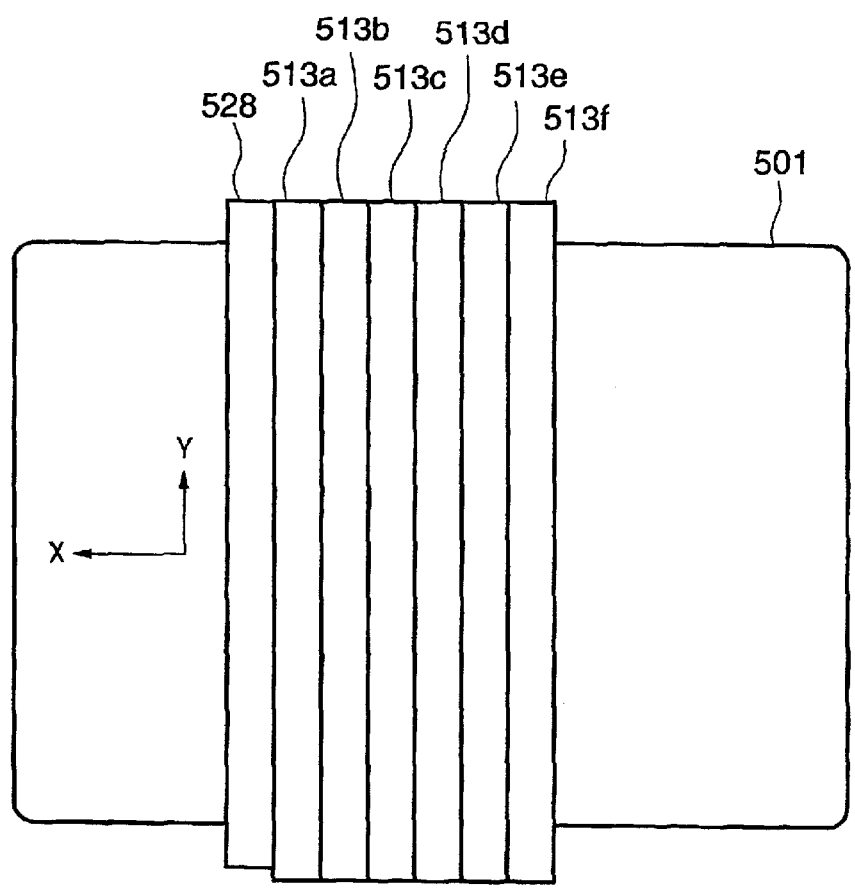
FIG. 14 is a view explaining an ink-jet printing apparatus according to a second embodiment of the present invention.

FIG. 14 is an explanatory view of the second embodiment of the present invention. This example employs a so-called full-multi printing method. More specifically, means not shown in the drawing conveys the sheet 501 in the direction X at a constant speed. The printheads 513a to 513f, each comprising a number of nozzles (group of nozzles) provided for the entire length of the sheet 501 in the direction Y, are fixed as shown in FIG. 14. The printheads 513a to 513f perform image printing while the sheet 501 is conveyed in the direction X. Furthermore, a density sensor 528, provided for the entire length of the sheet 501, measures density printed by the nozzles on the sheet 501.

A transparent type sensor or a reflective type sensor can be used as the density sensor 528. The transparent type sensor includes a light emitting part and a light receiving part, and one of these parts is installed at the position of 528, and the other is installed at the position opposite to the sheet (not shown).

Figure 15:
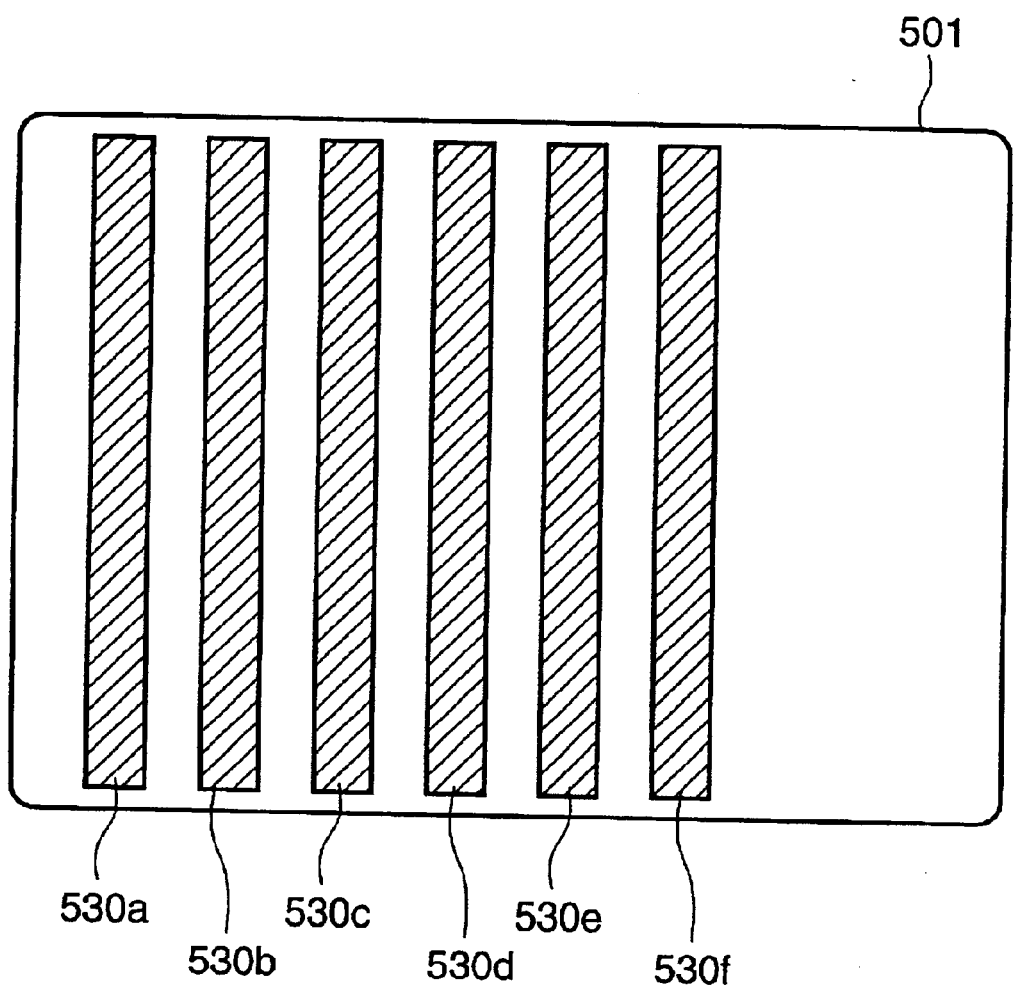
FIG. 15 shows an example of a test pattern printed according to the multi-printing method shown in FIG. 14.

Similar to the first embodiment, 100% printing is performed on a part of the sheet 501 using all nozzles of each group of nozzles. FIG. 15 shows an example of a test pattern printed according to the multi-printing method shown in FIG. 14. The density sensor 528 reads the test pattern to obtain a density value of each of the nozzles, as described above with reference to FIGS. 5 and 6. The obtained density is stored in the per-nozzle density table 104c.

In the multi-printing method, once a pixel of interest is determined, nozzles to be used are determined as similar to the first embodiment. More specifically, the relative position relation between the head position and an image is predetermined for each scan. Therefore, once a pixel of interest is determined, nozzles to be used (nozzle candidates) are determined for each density. From the nozzle candidates, nozzles actually used for printing are decided with reference to the ink superimposition combination table 104b so as to achieve a density value (CD) to be printed for the pixel of interest. Then, the transmission density value OD to be obtained in actual printing is calculated with reference to the per-nozzle density table 104c, and error diffusion processing is performed similar to the first embodiment.

As has been described above, according to the second embodiment, an ink-jet printing apparatus employing the multi-printing method can also perform error diffusion in view of the density value for each nozzle, therefore the apparatus can also correct density unevenness caused by the nozzles.

Note in the foregoing first and second embodiments, a per-nozzle density table is provided with respect to all groups of nozzles, provided for printing in plural colors and plural densities, to perform compensation control of the printing density. However, the above embodiments are applicable to a printing apparatus having a group of nozzles for printing in a single density of a single color (in this case, the ink distribution processing 113 in FIG. 8 is not necessary).

Furthermore, a print density may be compensated by providing a per-nozzle density table for the nozzles selected from the plurality of nozzles for printing in plural colors and plural densities. For instance, in the configuration having two types of densities for cyan, magenta and yellow and six types of densities for black, a per-nozzle density table may be provided for the nozzles for black only. In this case, the nozzles for cyan, magenta, and yellow adopts, for instance, the designed values shown in the third row in FIG. 10, and unevenness generated among the nozzles is not considered. Such construction ensures a high quality image in monochrome printing using black ink. Therefore, a print image appropriate for, e.g., a medical image, can be obtained. Although density compensation for each nozzle is not performed with respect to a color image, necessary information can be provided since the resolving power of human eyes for a color image is low. Furthermore, since density control for each nozzle is not necessary, the amount of memory necessary for the table or the like and the amount of processing can be reduced.

Furthermore, in the foregoing embodiments, although discharge signals are developed in the bit planes within the ink-jet printing apparatus, the present invention is not limited to this. For instance, an external apparatus connected to the ink-jet printing apparatus, for instance, a host computer supplying image data, may develop discharge signals and send developed data to the ink-jet printing apparatus.

Still further, although the foregoing embodiments perform error diffusion processing as an example of density compensation, other pseudo halftone processing (e.g., dither processing, density pattern method or the like) can be performed.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or recording medium), storing program codes of a software realizing the above-described functions of the embodiments, to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been described above, according to the present invention, density unevenness in each nozzle can be corrected, and high-quality image formation is realized. Furthermore, in the case of printing an image by constructing a pixel with plural types of ink superimposition, density unevenness in each nozzle can be corrected, and high quality image formation is realized.

As many apparently widely different embodiments of the present invention can be made without departing from the spirit and scope thereof, it is to be understood that the invention is not limited to the specific embodiments thereof except as defined in the claims.

What is claimed is:

1. An ink-jet printing apparatus for printing a pixel with inks discharged from a plurality of nozzles, comprising:

a printhead including a plurality of groups of nozzles, each of which is constituted by a plurality of nozzles;

storage means for storing a density table indicating a print density of ink discharged from each nozzle constituting the plurality of groups of nozzles;

determination means for determining, with respect to a pixel, a nozzle to be driven for discharge in each of the plurality of groups of nozzles; and density compensation means for obtaining from the density table print densities corresponding to nozzles determined to be driven for discharge by said determination means, calculating a print density for the pixel based on the obtained print densities, and performing compensation control of a print density based on the calculated print density.

2. The apparatus according to claim 1, wherein said density compensation means performs error diffusion processing by using a difference between the print density obtained from the density table and a print density designated by image data.

3. The apparatus according to claim 1, further comprising:

pattern printing means for printing a predetermined pattern on a predetermined area of a print medium by using the plurality of groups of nozzles;

detection means for detecting a density of each part of the pattern printed by said pattern printing means; and generation means for generating the density table by obtaining a print density of ink discharged from each nozzle of the plurality of groups of nozzles based on the density of each part detected by said detection means.

4. An ink-jet printing apparatus for printing a pixel with dots formed with plural types of ink, comprising:

a printhead including a plurality of groups of nozzles provided for a plurality of types of ink, each of said groups of nozzles constituted by a plurality of nozzles corresponding to one type of ink, storage means for storing a density table, indicating a print density of ink discharged from each nozzle constituting a group of nozzles, for at least one group of nozzles among the plurality of groups of nozzles of the printhead;

determination means for determining at least one nozzle to be driven for discharge among the plurality of groups of nozzles, with respect to a pixel of interest, based on image data;

calculation means for obtaining at least one print density corresponding to the at least one nozzle determined to be driven for discharge by said determination means, with reference to the density table, and calculating a print density of the pixel of interest based on the at least one obtained print density; and density compensation means for performing compensation control of a print density based on the print density of the pixel of interest calculated by said calculation means and a print density of the pixel of interest designated by the image data.

5. The apparatus according to claim 4, wherein said calculation means obtains a print density value from the density table for calculating a print density of the pixel of interest in a case where the density table has a table corresponding to a group of nozzles inclusive of the at least one nozzle determined to be driven for discharge, whereas said calculation means obtains a print density value predetermined for each group of nozzles in a case where the density table does not have a corresponding table.

6. The apparatus according to claim 4, wherein the plural types of ink include plural inks of a single color having different densities, and one pixel is expressed in multiple tones by superimposing inks having different densities, said storage means stores a density table at least for the plurality of groups of nozzles corresponding to the different densities, and said calculation means calculates the print density of the pixel of interest by obtaining a print density corresponding to the at least one nozzle determined to be driven for discharge by said determination means, with reference to the density table, and summing the at least one obtained print density.

7. The apparatus according to claim 4, wherein said density compensation means performs error diffusion processing by using a difference between the print density of the pixel of interest obtained by said calculation means and the print density of the pixel of interest designated by the image data.

8. The apparatus according to claim 4, further comprising:

pattern printing means for printing a predetermined pattern on a predetermined area of a print medium by using at least one group of nozzles of the plurality of groups of nozzles;

detection means for detecting a print density of each part of the pattern printed by said pattern printing means; and generation means for obtaining a print density for each nozzle of the at least one group of nozzles used by said pattern printing means, based on the ink density of each part detected by said detection means, and generating a density table corresponding to the at least one group of nozzles.

9. The apparatus according to claim 6, wherein said determination means assigns a print density for each type of ink having inks of different densities, selects a combination of types of ink which achieves a closest print density value designated by the image data with respect to the pixel of interest, and determines a nozzle to be driven for discharge among the plurality of groups of nozzles based on the selected combination.

10. A control method of an ink-jet printing apparatus which prints a pixel with inks discharged from a plurality of nozzles by using a printhead including a plurality of groups of nozzles, each of which is constituted by a plurality of nozzles, comprising the steps of:

storing a density table indicating a print density of ink discharged from each nozzle constituting the plurality of groups of nozzles;

determining, with respect to a pixel, a nozzle to be driven for discharge in each of the plurality of groups of nozzles; and obtaining from the density table print densities corresponding to nozzles determined to be driven for discharge at said determination step, calculating a print density of the pixel based on the obtained print densities, and performing compensation control of a print density based on the calculated print density.

11. The method according to claim 10, wherein at said density compensation step, error diffusion processing is executed by using a difference between the print density obtained from the density table and a print density designated by image data.

12. The method according to claim 10, further comprising:

a pattern printing step of printing a predetermined pattern on a predetermined area of a print medium by using the plurality of groups of nozzles;

a detection step of detecting a print density of each part of the pattern printed at said pattern printing step; and a generation step of generating the density table by obtaining a print density of ink discharged from each nozzle of the plurality of groups of nozzles based on the print density of each part detected at said detection step.

13. A control method of an inkjet printing apparatus for printing a pixel with dots formed with plural types of ink by utilizing a printhead including a plurality of groups of nozzles provided for a plurality of types of ink, each of said groups of nozzles constituted by a plurality of nozzles corresponding to one type of ink, said method comprising the steps of:

storing a density table, indicating a print density of ink discharged from each nozzle constituting a group of nozzles, for at least one group of nozzles among the plurality of groups of nozzles of the printhead;

determining at least one nozzle to be driven for discharge among the plurality of groups of nozzles, with respect to a pixel of interest, based on image data;

obtaining at least one print density corresponding to the at least one nozzle determined to be driven for discharge at said determination step, with reference to the density table, and calculating a print density of the pixel of interest based on the at least one obtained print density; and performing compensation control of a print density based on the print density of the pixel of interest calculated at said calculation step and a print density of the pixel of interest designated by the image data.

14. The method according to claim 13, wherein at said calculation step, a print density value is obtained from the density table for calculating a print density of the pixel of interest in a case where the density table has a table corresponding to a group of nozzles inclusive of the at least one nozzle determined to be driven for discharge, whereas a print density value predetermined for each group of nozzles is obtained in a case where the density table does not have a corresponding table.

15. The method according to claim 13, wherein the plural types of ink include plural inks of a single color having different densities, and one pixel is expressed in multiple tones by superimposing inks having different densities, at said storage step, a density table is stored at least for the plurality of groups of nozzles corresponding to the different densities, and at said calculation step, the print density of the pixel of interest is calculated by obtaining a print density corresponding to the at least one nozzle determined to be driven for discharge at said determination step, with reference to the density table, and summing the at least one obtained print density.

16. The method according to claim 13, wherein at said density compensation step, error diffusion processing is performed by using a difference between the print density of the pixel of interest obtained at said calculation step and the print density of the pixel of interest designated by the image data.

17. The method according to claim 13, further comprising:

a pattern printing step of printing a predetermined pattern on a predetermined area of a print medium by using at least one group of nozzles of the plurality of groups of nozzles;

a detection step of detecting an ink density of each part of the pattern printed at said pattern printing step; and a generation step of obtaining a print density for each nozzle of the at least one group of nozzles used at said pattern printing step, based on the ink density of each part detected at said detection step, and generating a density table corresponding to the at least one group of nozzles.

18. The method according to claim 15, wherein at said determination step, a designed print density is assigned for each type of ink having inks of different densities, a combination of types of ink which achieves a closest print density value designated by the image data is selected with respect to the pixel of interest, and a nozzle to be driven for discharge is determined among the plurality of groups of nozzles based on the selected combination.

19. A data processing apparatus generating print-driving data for a printing apparatus which prints a pixel with inks discharged from a plurality of nozzles and which has a printhead including a plurality of groups of nozzles each of which is constituted by a plurality of nozzles, said data processing apparatus comprising:

storage means for storing a density table indicating a print density of ink discharged from each nozzle constituting the plurality of groups of nozzles;

determination means for determining, with respect to a pixel, a nozzle to be driven for discharge in each of the plurality of groups of nozzles;

density compensation means for obtaining from the density table print densities corresponding to nozzles determined to be driven for discharge by said determination means, calculating a print density for the pixel based on the obtained print densities, and performing compensation control of a print density on said determination means based on the calculated print density; and output means for outputting data, indicative of the nozzles to be driven for discharge, determined by said determination means, as the print-driving data.

20. A data processing apparatus generating print-driving data for a printing apparatus which prints a pixel with dots formed with plural types of ink by utilizing a printhead including a plurality of groups of nozzles provided for a plurality of types of ink, each of said groups of nozzles constituted by a plurality of nozzles corresponding to one type of ink, comprising:

storage means for storing a density table, indicating a print density of ink discharged from each nozzle constituting a group of nozzles, for at least one group of nozzles among the plurality of groups of nozzles of the printhead;

determination means for determining at least one nozzle to be driven for discharge among the plurality of groups of nozzles, with respect to a pixel of interest based on image data;

calculation means for obtaining at least one print density corresponding to the at least one nozzle determined to be driven for discharge by said determination means, with reference to the density table, and calculating a print density of the pixel of interest based on the at least one obtained print density;

density compensation means for performing compensation control of a print density on said determination means based on the print density of the pixel of interest calculated by said calculation means and a print density of the pixel of interest designated by the image data; and output means for outputting data, indicative of the at least one nozzle to be driven for discharge, determined by said determination means, as the print-driving data.

21. A data processing method of generating print-driving data for a printing apparatus which prints a pixel with inks discharged from a plurality of nozzles and which has a printhead including a plurality of groups of nozzles each of which is constituted by a plurality of nozzles corresponding to ink of one color having one density, said method comprising the steps of:

storing a density table indicating a print density of ink discharged from each nozzle constituting the plurality of groups of nozzles;

determining, with respect to a pixel, a nozzle to be driven for discharge in each of the plurality of groups of nozzles;

obtaining from the density table print densities corresponding to nozzles determined to be driven for discharge at said determination step, calculating a print density for the pixel based on the obtained print densities, and performing compensation control of a print density for said determination step based on the calculated print density; and outputting data, indicative of the nozzles to be driven for discharge, determined at said determination step, as the print-driving data.

22. A data processing method of generating print-driving data for a printing apparatus which prints a pixel with dots formed with plural types of ink by utilizing a printhead including a plurality of groups of nozzles provided for a plurality of types of ink, each of said groups of nozzles constituted by a plurality of nozzles corresponding to one type of ink, said method comprising the steps of:

storing a density table, indicating a print density of ink discharged from each nozzle constituting a group of nozzles, for at least one group of nozzles among the plurality of groups of nozzles of the printhead;

determining at least one nozzle to be driven for discharge among the plurality of groups of nozzles, with respect to a pixel of interest based on image data;

obtaining at least one print density corresponding to the at least one nozzle determined to be driven for discharge at said determination step, with reference to the density table, and calculating a print density of the pixel of interest based on the at least one obtained print density;

performing compensation control of a print density for said determination step based on the print density of the pixel of interest calculated at said calculation step and a print density of the pixel of interest designated by the image data; and outputting data, indicative of the at least one nozzle to be driven for discharge, determined at said determination step, as the print-driving data.

23. A storage medium storing a control program which causes a computer to execute a data processing method of generating print-driving data for a printing apparatus which prints a pixel with inks discharged from a plurality of nozzles and which has a printhead including a plurality of groups of nozzles each of which is constituted by a plurality of nozzles, said data processing method comprising the steps of:

storing a density table indicating a print density of ink discharged from each nozzle constituting the plurality of groups of nozzles;

determining, with respect to a pixel, a nozzle to be driven for discharge in each of the plurality of groups of nozzles, based on image data;

obtaining from the density table print densities corresponding to nozzles determined to be driven for discharge at said determination step, calculating a print density for the pixel based on the obtained print densities, and performing compensation control of a print density for said determination step based on the calculated print density; and outputting data, indicative of the nozzles to be driven for discharge, determined at said determination step, as the print-driving data.

24. A storage medium storing a control program which causes a computer to execute a data processing method of generating print-driving data for a printing apparatus which prints a pixel with dots formed with plural types of ink by utilizing a printhead including a plurality of groups of nozzles provided for a plurality of types of ink, each of said groups of nozzles constituted by a plurality of nozzles corresponding to one type of ink, said data processing method comprising the steps of:

storing a density table, indicating a print density of ink discharged from each nozzle constituting a group of nozzles, for at least one group of nozzles among the plurality of groups of nozzles of the printhead;

determining at least one nozzle to be driven for discharge among the plurality of groups of nozzles, with respect to a pixel of interest based on image data;

obtaining at least one print density corresponding to the at least one nozzle determined to be driven for discharge at said determination step, with reference to the density table, and calculating a print density of the pixel of interest based on the at least one obtained print density;

performing compensation control of a print density for said determination step based on the print density of the pixel of interest calculated at said calculation step and a print density of the pixel of interest designated by the image data; and outputting data, indicative of the at least one nozzle to be driven for discharge, determined at said determination step, as the print-driving data.

* * * * *